United States Patent
Brazell et al.

(10) Patent No.: US 6,848,350 B2
(45) Date of Patent: Feb. 1, 2005

(54) STOCK STOP MITER GAUGE

(75) Inventors: Kenneth M. Brazell, Piedmont, SC (US); Robert G. Everts, Camp Verde, AZ (US)

(73) Assignee: One World Technologies Limited, Hamilton (BM)

( * ) Notice: Subject to any disclaimer, the term of this patent is extended or adjusted under 35 U.S.C. 154(b) by 45 days.

(21) Appl. No.: 09/946,262

(22) Filed: Sep. 4, 2001

(65) Prior Publication Data

US 2003/0041715 A1 Mar. 6, 2003

(51) Int. Cl.[7] ............................................. B26D 7/02
(52) U.S. Cl. ......................... 83/435.11; 83/435.14; 83/449; 83/452; 83/453; 83/459; 83/462; 83/466
(58) Field of Search .................... 83/448, 449, 438, 83/435.11–435.27, 466, 466.1, 462, 460, 459, 458, 453, 477.2, 452, 409–415, 451; D10/65; D8/71; D15/13

(56) References Cited

U.S. PATENT DOCUMENTS

| | | | | |
|---|---|---|---|---|
| 346,240 A | * | 7/1886 | Soukup | 83/763 |
| 399,965 A | * | 3/1889 | Bradley | 83/449 |
| 477,233 A | * | 6/1892 | Soukup | 83/767 |
| 546,887 A | * | 9/1895 | Hyller | 83/766 |
| 623,156 A | * | 4/1899 | Humphrey | 83/435.11 |
| 752,406 A | | 2/1904 | Nichols | |
| 757,770 A | * | 4/1904 | Richter | 83/745 |
| 778,642 A | | 12/1904 | Dunne | |
| 1,894,010 A | * | 1/1933 | Tautz | 269/55 |
| 2,010,882 A | | 8/1935 | Ocenasek | |
| 2,043,555 A | * | 6/1936 | Preston | 38/102 |
| 2,696,854 A | * | 12/1954 | Woodruff | 83/435.14 |
| 2,752,960 A | * | 7/1956 | Poelti | 269/94 |
| 2,785,709 A | * | 3/1957 | Shepp | 83/435.14 |
| 2,884,965 A | * | 5/1959 | Stahl | 83/435.14 |
| 3,051,204 A | * | 8/1962 | Gaskell | 33/437 |
| 3,232,159 A | * | 2/1966 | Stanley | 83/175 |
| 3,286,744 A | * | 11/1966 | Stall et al. | 83/409 |
| 3,397,722 A | | 8/1968 | Long | |
| 3,844,037 A | * | 10/1974 | Geller | 30/231 |
| 4,155,283 A | * | 5/1979 | Mericle | 83/409 |
| 4,164,882 A | * | 8/1979 | Mericle | 83/409 |
| 4,165,668 A | | 8/1979 | McCord, Jr. | |
| 4,602,890 A | * | 7/1986 | Duda | 403/105 |
| 4,658,686 A | * | 4/1987 | Woods | 83/425 |
| 4,875,399 A | | 10/1989 | Scott et al. | |
| 5,038,486 A | * | 8/1991 | Ducate, Sr. | 33/430 |
| 5,097,601 A | * | 3/1992 | Pollak et al. | 33/471 |
| 5,235,748 A | * | 8/1993 | Jahn | 30/1.5 |
| 5,560,273 A | * | 10/1996 | Keddie | 83/581 |
| 5,735,054 A | * | 4/1998 | Cole | 33/471 |
| D400,452 S | * | 11/1998 | Schoene et al. | D10/65 |
| D406,035 S | * | 2/1999 | Erisoty et al. | D8/71 |
| 6,334,380 B1 | | 1/2002 | Huang | |
| 6,502,492 B1 | * | 1/2003 | Krohmer et al. | 83/435.13 |
| 6,543,323 B2 | * | 4/2003 | Hayashizaki et al. | 83/466 |
| 6,584,698 B1 | * | 7/2003 | Liu | 83/435.14 |
| 6,668,695 B2 | * | 12/2003 | Poole et al. | 83/466 |
| 6,694,851 B2 | * | 2/2004 | Erisoty | 83/466 |
| 2002/0007712 A1 | | 1/2002 | Hayashizaki et al. | |
| 2003/0140745 A1 | * | 7/2003 | Lewis | 83/451 |

FOREIGN PATENT DOCUMENTS

EP        0236814 A1  *  9/1987  ............ B23Q/3/00

* cited by examiner

Primary Examiner—Allan N. Shoap
Assistant Examiner—Jason Prone
(74) Attorney, Agent, or Firm—Brooks Kushman P.C.

(57) ABSTRACT

The present invention discloses an improved miter gauge for retaining and adjustably positioning a workpiece. The miter gauge includes a fence frame pivotally mounted to a base member for adjusting the workpiece to be cut at a user selected angle. The fence frame includes a fence surface for positioning the workpiece. The fence surface is opposed by a quick-adjusting stopping unit mountable to the base member for clamping the workpiece therebetween.

7 Claims, 4 Drawing Sheets

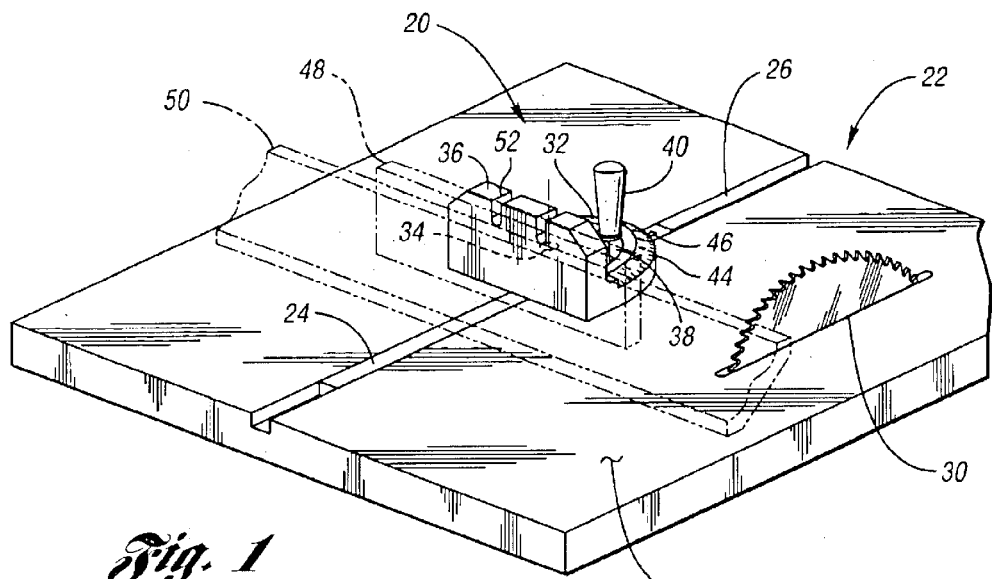
Fig. 1
(PRIOR ART)
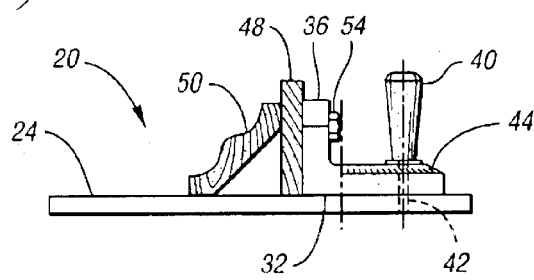
Fig. 2 (PRIOR ART)
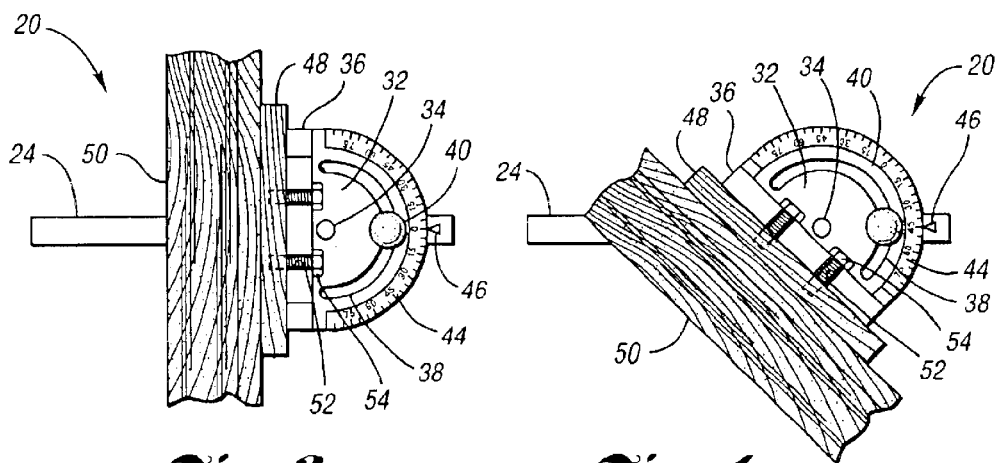
Fig. 3
(PRIOR ART)
Fig. 4
(PRIOR ART)

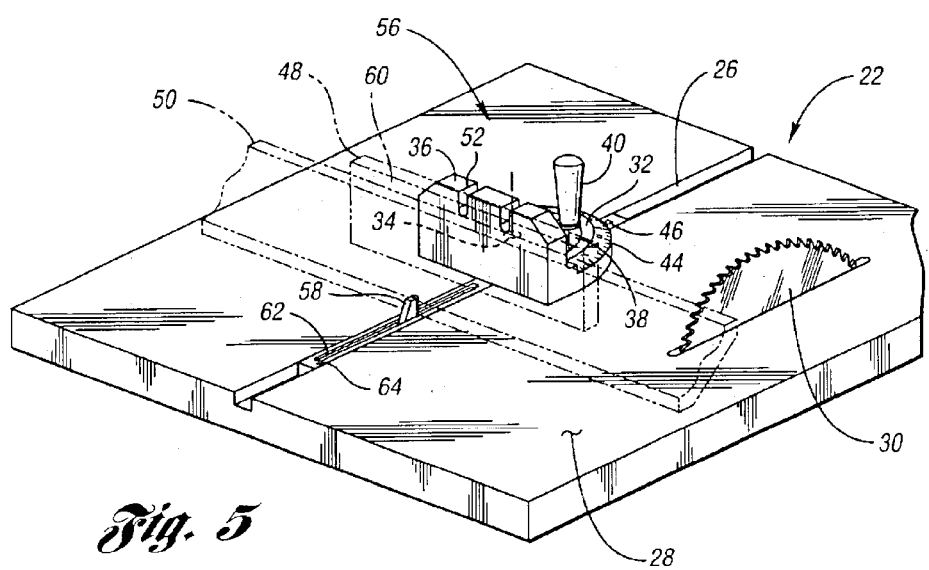
Fig. 5
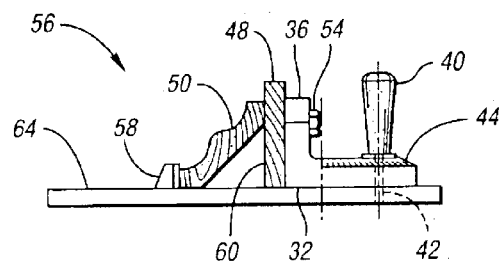
Fig. 6
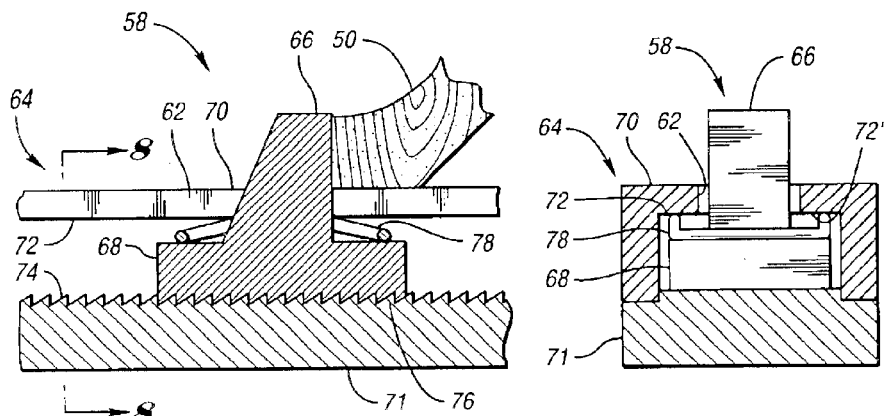
Fig. 7
Fig. 8

STOCK STOP MITER GAUGE

BACKGROUND OF THE INVENTION

1. Field of the Invention

The present invention relates to a miter gauge for retaining and adjustably positioning a workpiece to be cut by a table saw or the like.

2. Background Art

Miter gauges are produced in a variety of different types and configurations. These gauges are commonly used for positioning a wooden workpiece to be cut at a user selected angle by a table saw. Miter gauges usually include a fence for abutting the workpiece. They commonly include a semicircular gauge for angular adjustment to a base member which slidingly cooperates within a slotted recess in the saw table top.

Conventional miter gauges generally do not include a stop for retaining the workpiece. Retaining a workpiece to be cut by a saw tends to be time consuming to set up and tedious for multiple cutting operations. The stop is frequently unnecessary if the user can easily hold the workpiece against the fence of the miter gauge during the sawing operation. However, not all workpiece styles are easy to hold against the miter gauge fence while cutting. A primary example, crown molding, is difficult to hold while cutting. Crown molding is ornamental by design and is typically used for decoration within corners, commonly requiring the molding to be cut at a miter angle. A crown molding section is primarily angular, but has perpendicular surfaces for abutting within the corner. These surfaces are small in comparison to the molding body and are difficult to hold against both the miter gauge fence and saw table at the correct angle. When the piece of crown molding is held abutting the fence, the user is forced to hold the molding along its ornamental side.

Provisions have been made in the past to eliminate the need for the user to hold the workpiece during cutting operations. U.S. Pat. No. 778,642, issued to R. Dunne, discloses a method for clamping a workpiece while applying miter cuts. However, this method requires loosening a nut, positioning a stop and retightening the nut in order to make a single cut. The time required to set-up the clamp may not justify the ease provided while cutting the workpiece.

Another invention for clamping the workpiece while cutting is disclosed in U.S. Pat. No. 4,165,668, issued to Vermont American Corporation. With this design, the user is required to adjust a vertical screw pad for the height of the workpiece, loosen a wing nut, position a moveable jaw, and retighten the wing nut in order to make a single cut. Although this design clamps the workpiece in both horizontal and vertical directions, this design is time consuming to set up also.

U.S. Pat. No. 4,875,399, issued to William D. Scott et al., discloses an invention for clamping a workpiece to be cut by a saw by use of registration blocks pivotally mounted to trap the lower edge of the workpiece. This design requires loosening of a nut, positioning a slide block, and retightening of the nut for a single cutting operation. This design prevents the user from holding the workpiece while cutting, but does not provide any means for quick adjustment.

Various techniques and designs have provided miter gauges and/or clamps for positioning a workpiece to be cut by a saw. Although these designs may eliminate the need for the user to hold the workpiece against the fence while making the cut, it may not outweigh the time and efforts required for adjusting the clamp. Further, the workpiece does not need to be clamped; rather, all that is required is that the workpiece be retained during the cutting operation. Accordingly, it is the goal of the present invention to provide a simple low cost miter gauge with a quick-adjusting stop for retaining the workpiece at a selected angle to be cut by a saw.

SUMMARY OF THE INVENTION

The stock stop miter gauge of the present invention is similar to conventional miter gauges, however, the present invention includes a quick-adjusting movable stopping unit for retaining the workpiece. This miter gauge includes a base member, a fence frame, an adjustment handle, and a stopping unit. The fence frame is pivotally rotatable with respect to the base member and the adjustment handle retains the fence frame at a user selected angle. The fence frame has a vertical fence for supporting the workpiece and the stopping unit retains the workpiece against the fence. The quick-adjusting stopping unit makes it much easier for the user to retain the workpiece while cutting and allows the user to perform similar cutting operations with little or no adjustment.

BRIEF DESCRIPTION OF THE DRAWINGS

FIG. 1 is a perspective view of a prior art miter gauge with a typical prior art table saw;

FIG. 2 is a side view of the prior art miter gauge of FIG. 1;

FIG. 3 is a top view of the prior art miter gauge of FIG. 1;

FIG. 4 is a top view of the prior art miter gauge of FIG. 1 with the workpiece positioned at a 45° angle;

FIG. 5 is a perspective view of a preferred embodiment miter gauge mounted on a table saw;

FIG. 6 is a side view of the miter gauge of FIG. 5;

FIG. 7 is an enlarged section view of the stopping unit of the miter gauge of FIG. 5;

FIG. 8 is an enlarged section view of the stopping unit taken along section line 8—8 in FIG. 7;

DETAILED DESCRIPTION OF THE PREFERRED EMBODIMENTS

Figure 9:
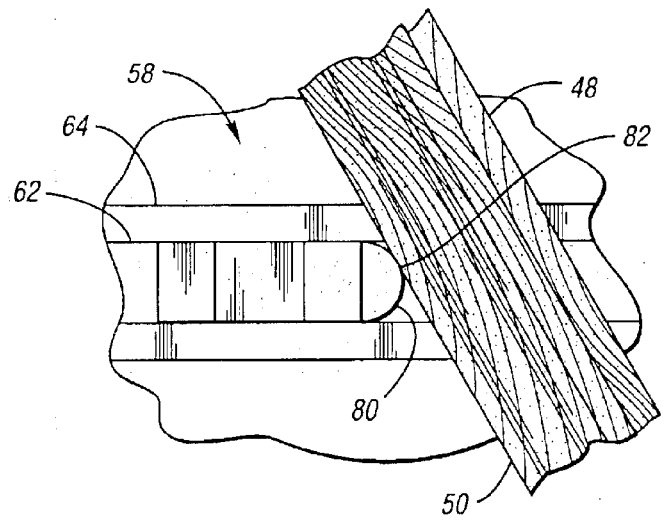
FIG. 9 is an enlarged top plan view of the stopping unit with the workpiece position at an angle relative to the saw blade.

FIGS. 1–4 illustrate a prior art miter gauge 20. FIG. 1 illustrates the miter gauge 20 used in combination with a prior art table saw 22. The table saw 22 includes a table 28 with a saw blade 30 protruding through the table 28. The miter gauge 20 includes a longitudinal base member 24, made of a metal, typically aluminum. The base member 24 cooperates with a recess 26 formed within the table 28 parallel to the saw blade 30.

Fence frame 32 is pivotally mounted to the base member by a pivot pin 34. The pivot pin 34 is perpendicular to the table 28. The fence frame 32 is a semicircular unit formed with an upright planar surface commonly referred to as a fence 36. The fence 36 is typically formed of a high strength molded plastic. An arcuate slot 38 is formed through the fence frame 32 concentric to the pivot pin 34. An adjustment handle 40 cooperates with the arcuate slot 38 and a has a threaded end engaged in a threaded hole 42 in the base member 24 as illustrated in FIG. 2.

A user can adjust the fence frame 32 by loosening the adjustment handle 40 and rotating the fence frame 32 pivotally with respect to the base member 24. Semicircular array of indicia 44 is formed about the fence frame 32. A plurality of predetermined positions may be selected by aligning the desired angle indicated on the indicia 44 with an index pointer 46 formed to the base member 24. Adjustment of the fence frame 32 determines the angle of the cut of workpiece 50 in respect to the saw blade 30. FIGS. 3 and 4 are examples illustrating different angular adjustments of the workpiece 50.

The fence 36 has fence slots 52 allowing the user to mount a wooden fence extension 48 to the fence 36 with fasteners 54. The extension 48 protects the workpiece 50 from any unwanted marks that may be caused by the fence 36 and extends the support surface. The extension 48 is typically supplied by the user, allowing the user to create an extension 48 that is an appropriate size for the application. The extension 48 can be cheaply and easily replaced if damaged, or modified to suit the specific workpiece to be cut. The extension 48 and workpiece 50 are shown in phantom in FIGS. 1, 5 and 10 to provide clarity of the additional elements in these figures.

FIGS. 5 and 6 illustrate a preferred embodiment of a miter gauge 56. Elements common to the prior art design retain like reference numbers, while modified components are renumbered. The miter gauge 56 includes a stopping unit 58 for retaining the workpiece 50 against the opposed fence surface 60 of the extension 48. The stopping unit 58 is slidable within slot 62 formed within base member 64.

FIG. 7 illustrates an enlarged section view of the stopping unit 58. FIG. 8 illustrates an enlarged section view along section line 8—8 in FIG. 7. The stopping unit 58 includes an upper portion 66 and lower portion 68. The upper portion 66 extends vertically out of the base member 64 through the slot 62. The slot 62 is stepped within the base member 64, providing gibs 72 and 72' on opposed sides of the upper portion 66 of the stopping unit 58. The lower portion 68 of the stopping unit 58 is wider than the slot 62 and is retained within the base member 64 by the gibs 72 and 72'. The base member 64 includes an upper portion 70 and lower portion 71 assembled together to house the stopping unit 58.

The upper surface of the lower portion 71 oriented within slot 62 includes a plurality of first ramped teeth 74. The lower portion 68 of the stopping unit 58 includes an opposing plurality of second ramped teeth 76. A wave spring 78 is mounted to the lower portion 68 of the stopping unit 58. The spring 78 is compressed between the gibs 72 and 72' and the lower portion 68 of the stopping unit 58, biasing the first and second sets of teeth 74 and 76 together as shown.

The design illustrated in this invention provides quick adjustment of the stopping unit 58 in a snap-and-slide motion. The first ramped teeth 74 are inclined in the direction of the fence 36. This allows the user to retain the workpiece 50 by urging the upper portion 66 of the stopping unit in the direction of the workpiece 50. Once the stopping unit 58 is indexed to a user selected position, the stopping unit 58 is retained in position by the engaged first and second ramped teeth 74 and 76.

The present invention also permits the user to quickly adjust the stopping unit 58 away from the fence surface 60. The user simply lifts the stopping unit 58 to bias the upper portion 66 in a direction away from the base member 64. This compresses the wave spring 78, allowing the first and second ramped teeth 74 and 76 to disengage. The user can then slide the stopping unit 58 in a direction away from fence surface 60.

FIG. 9 illustrates an enlarged top view of the stopping unit 58 at another angular adjustment of the workpiece 50. The upper portion 66 of the stopping unit 58 has a curved cylindrical surface 80 for contacting the workpiece 50. The cylindrical surface 80 provides a line contact 82 with the workpiece 50 at any angular position.

Figure 10:
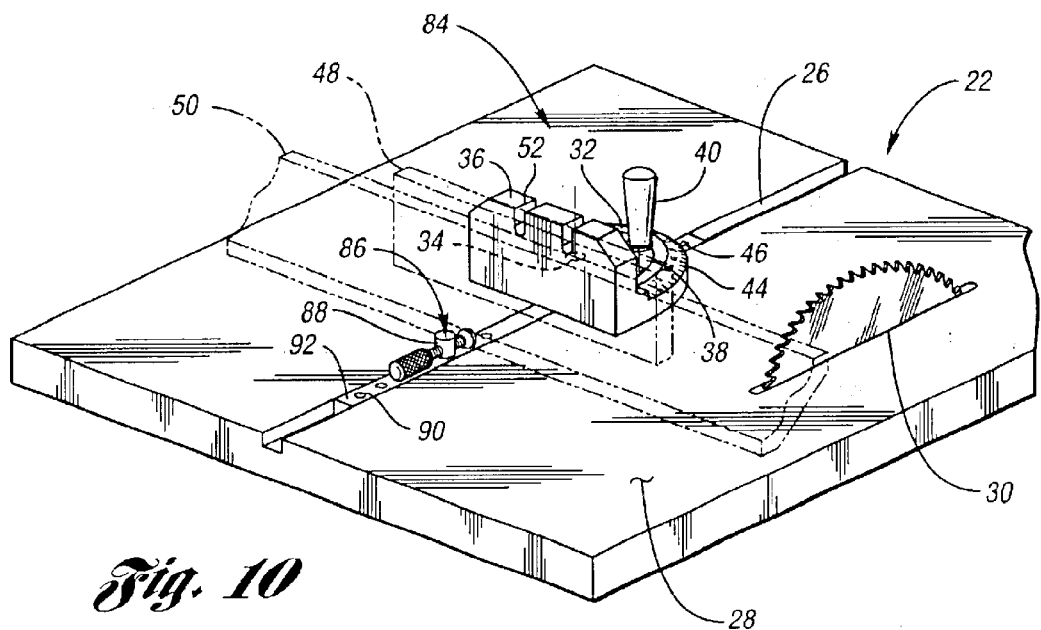
FIG. 10 is a perspective view of another embodiment miter gauge mounted upon a table saw.
Figure 11:
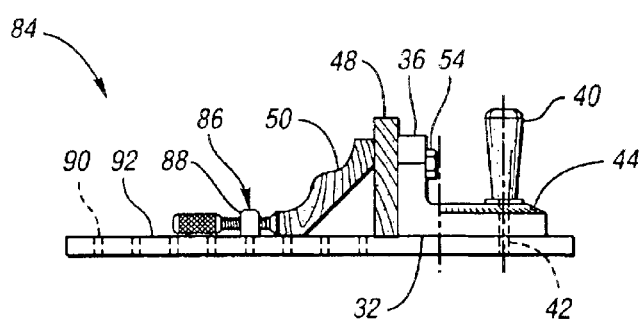
FIG. 11 is a side view of the miter gauge of FIG. 10.

FIGS. 10 and 11 illustrate another embodiment of a miter gauge 84. Elements common to the prior art design retain like reference numbers, while modified components are renumbered. The miter gauge 84 includes a stopping unit 86 for retaining the workpiece 50 against the opposed fence surface 60 of the extension 48. The stopping unit 86 includes a peg 88 cooperating with one of a plurality of sockets 90 formed within base member 92. The sockets 90 are spaced incrementally allowing rough indexing of the stopping unit 86.

Figure 12:
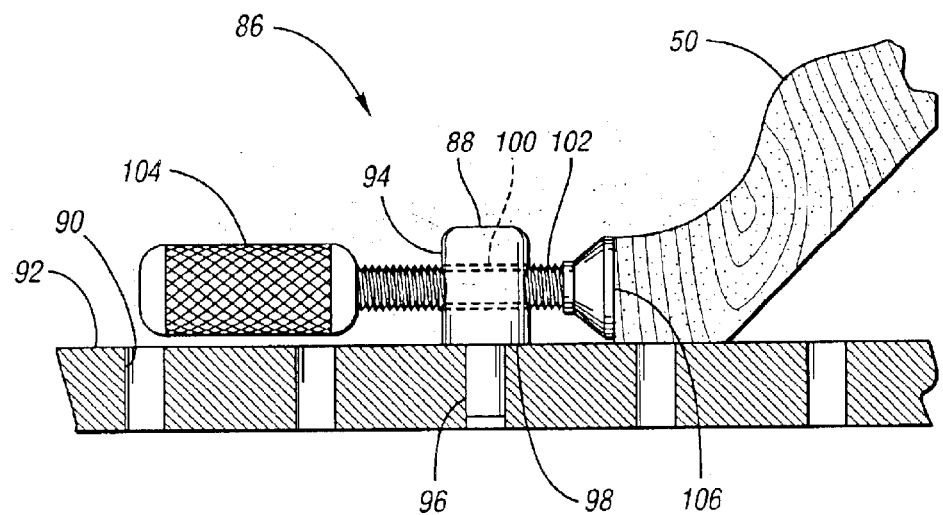
FIG. 12 is an enlarged partial section view of the stopping unit of the miter gauge of FIG. 10.

FIG. 12 illustrates an enlarged partial cross section side view of the stopping unit 86. The peg 88 has a body 94 and a smaller pivot diameter 96 forming a step 98. The pivot diameter 96 is sized to allow the peg 88 to pivotally rotate within the sockets 90. The step 98 rests atop the base member 92. The body 94 of the peg 88 includes a threaded hole 100 for receiving a thumbscrew 102. The thumbscrew 102 permits fine adjustment of the stopping unit 86 against the workpiece 50. The thumbscrew 102 has a knurled surface 104 at one end for manual adjustment and a contact surface 106 at the opposed end for contacting the workpiece 50.

Figure 13:
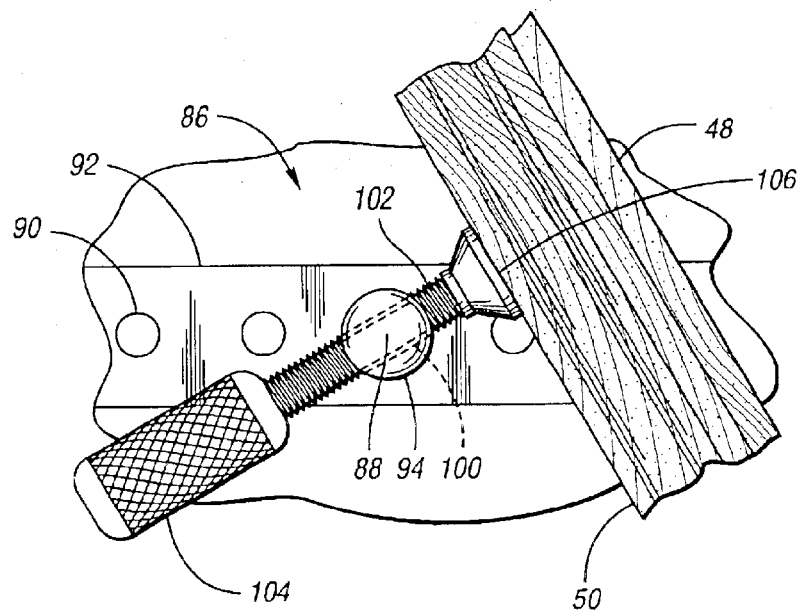
FIG. 13 is an enlarged partial top plan view of the stopping unit of the miter gauge of FIG. 10 with the workpiece oriented at an angle to the saw blade.

FIG. 13 illustrates an enlarged top view of the stopping unit 86 with an angular adjustment of the workpiece 50. The stopping unit 86, being pivotally rotatable with respect to the base member 92, allows the contact surface 106 to contact the workpiece 50 perpendicularly at any angle of adjustment of the workpiece 50.

The present invention retains the workpiece 50, permitting the user to securely hold the workpiece 50 during cutting. Accordingly, the present invention is a low cost solution to the miter gauge positioning problem while providing quick-adjustment in comparison to prior art devices. Further, it may be considered that the present invention may be used to clamp the workpiece 50; however stopping the workpiece 50 at a user-selected position is all that is necessary to perform a proper cutting operation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An improved miter gauge for use with a table saw having a planar table provided with an elongate recessed channel spaced parallel to a saw blade, for retaining and adjustably positioning a workpiece with respect to the saw blade at a user selected angle, the miter gauge comprising:

a longitudinal base member sized to slidingly fit within the recessed channel in the table saw, the base member having a plurality of first indexing configurations spaced therealong;

a fence frame having a fence surface pivotally rotatable with respect to the base member and adjustable to a plurality of user selected predetermined positions with respect to the base member; and a quick-adjusting movable stopping unit mountable to the base member in sufficiently spaced opposition to the fence surface to receive the workpiece therebetween, said stopping unit having a second indexing configuration selectively cooperable with at least one of the first indexing configurations for retaining the stopping unit with respect to the fence surface at a selected spaced location when the fence surface is in its predetermined position;

wherein the stopping unit and the fence surface contact opposed surfaces of the workpiece; and wherein the base member includes a slot provided with a linear array of ratchet teeth for defining the plurality of first indexing configurations, the linear array of ratchet teeth having ramp surfaces allowing the stopping unit to be slid to the fence frame, and stop surfaces preventing the stopping unit to be slid away from the fence frame while engaged with the ratchet teeth, and the stopping unit include a spring for yieldably biasing the first and second indexing configurations together, said spring yielding its bias sufficiently to allow a user to adjust the cooperation of the first and second indexing configurations in a snap-and-slide motion as the stopping unit moves.

2. The miter gauge of claim 1, wherein the movable stopping unit is provided with a plurality of ratchet teeth to matingly cooperate with the ratchet teeth of the base member, wherein the user lifts the movable stopping unit against the bias of the spring in order to slide the movable stopping unit away from the fence frame.

3. The miter gauge of claim 2, wherein the stopping unit is configured to provide a line contact with the workpiece when the stopping unit is in spaced opposition to the fence surface.

4. An improved miter gauge for retaining and adjustably positioning a workpiece comprising:

a longitudinal base member having a plurality of first indexing configurations therealong;

a fence frame having a fence surface pivotally rotatable with respect to the base member and adjustable to a plurality of user selected predetermined positions with respect to the base member; and a quick-adjusting movable stopping unit mountable to the base member in sufficiently spaced opposition to the fence surface to receive the workpiece therebetween, said stopping unit having a second indexing configuration selectively cooperable with at least one of the first indexing configurations for retaining the stopping unit with respect to the fence surface at a selected spaced location when the fence surface is in its predetermined position;

wherein the stopping unit and the fence surface contact opposed surfaces of the workpiece; and wherein the base member includes slot provided with a linear array of ratchet teeth for defining the plurality of first indexing configurations, the linear array of ratchet teeth having ramp surfaces allowing the stopping unit to be slid to the fence frame, and stop surfaces preventing the stopping unit to be slid away from the fence frame while engaged with the ratchet teeth, and wherein the stopping unit includes a spring for yieldably biasing the first and second indexing configurations together, said spring yielding its bias sufficiently to allow a user to adjust the cooperation of the first and second indexing configurations in a snap-and-slide motion as the stopping unit moves.

5. The miter gauge of claim 4, wherein the stopping unit is configured to provide a line contact with the workpiece when the stopping unit is in spaced opposition to the fence surface.

6. An improved miter gauge for use with a table saw having a planar table provided with an elongate recessed channel spaced parallel to a saw blade, for retaining and adjustably positioning a workpiece with respect to the saw blade at a user selected angle, the miter gauge comprising:

a longitudinal base member sized to slidingly fit within the recessed channel in the table saw, the base member having a plurality of first indexing configurations spaced therealong;

a fence frame having a fence surface pivotally rotatable with respect to the base member and adjustable to a plurality of user selected predetermined positions with respect to the base member; and a quick-adjusting movable stopping unit mountable to the base member in sufficiently spaced opposition to the fence surface to receive the workpiece therebetween, said stopping unit having a second indexing configuration selectively cooperable with at least one of the first indexing configurations for retaining the stopping unit with respect to the fence surface at a selected spaced location when the fence surface is in its predetermined position;

wherein the stopping unit and the fence surface contact opposed surfaces of the workpiece;

wherein the base member includes a plurality of sockets for defining the first indexing configurations, and the second indexing configuration of the stopping unit is a peg, wherein the sockets are sized to receive the peg for providing adjustability of the stopping unit; and wherein the peg has a threaded hole and includes a thumb screw engaged through the threaded hole and having a contact surface movable with respect to the threaded hole for providing fine adjustment of the contact surface of the stopping unit with respect to the fence surface.

7. An improved miter gauge for retaining and adjustably positioning a workpiece comprising:

a longitudinal base member having a plurality of first indexing configurations therealong;

a fence frame having a fence surface pivotally rotatable with respect to the base member and adjustable to a plurality of user selected predetermined positions with respect to the base member; and a quick-adjusting movable stopping unit mountable to the base member in sufficiently spaced opposition to the fence surface to receive the workpiece therebetween, said stopping unit having a second indexing configuration selectively cooperable with at least one of the first indexing configurations for retaining the stopping unit with respect to the fence surface at a selected spaced location when the fence surface is in its predetermined position;

wherein the stopping unit and the fence surface contact opposed surfaces of the workpiece;

wherein the base member includes a plurality of sockets for defining the first indexing configurations, and the second indexing configuration of the stopping unit is peg, wherein the sockets are sized to receive the peg for providing adjustability of the stopping unit; and wherein the peg has a threaded hole and includes a thumb screw engaged through the threaded hole and having a contact surface movable with respect to the threaded hole for providing fine adjustment of the contact surface of the stopping unit with respect to the fence surface.

* * * * *